United States Patent
Ichie et al.

(10) Patent No.: US 11,421,297 B2
(45) Date of Patent: Aug. 23, 2022

(54) NON-ORIENTED ELECTRICAL STEEL SHEET

(71) Applicant: NIPPON STEEL CORPORATION, Tokyo (JP)

(72) Inventors: Takeru Ichie, Tokyo (JP); Masaru Takahashi, Tokyo (JP); Fuminobu Murakami, Tokyo (JP); Shinichi Matsui, Tokyo (JP); Masahiro Yamamoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 22 days.

(21) Appl. No.: 16/975,334

(22) PCT Filed: Mar. 20, 2019

(86) PCT No.: PCT/JP2019/011749
§ 371 (c)(1),
(2) Date: Aug. 24, 2020

(87) PCT Pub. No.: WO2019/182022
PCT Pub. Date: Sep. 26, 2019

(65) Prior Publication Data
US 2020/0399731 A1    Dec. 24, 2020

(30) Foreign Application Priority Data

Mar. 23, 2018 (JP) .............................. JP2018-056310

(51) Int. Cl.
*C21D 6/00* (2006.01)
*C21D 8/00* (2006.01)
(Continued)

(52) U.S. Cl.
CPC ............... *C21D 9/46* (2013.01); *C21D 6/005* (2013.01); *C21D 6/008* (2013.01); *C21D 8/005* (2013.01);
(Continued)

(58) Field of Classification Search
CPC ......... C21D 9/46; C21D 6/005; C21D 6/008; C21D 8/005; C21D 8/12; C21D 8/1222;
(Continued)

(56) References Cited

U.S. PATENT DOCUMENTS

2012/0013430 A1    1/2012  Morishige et al.
2013/0146187 A1    6/2013  Zaizen et al.
(Continued)

FOREIGN PATENT DOCUMENTS

CN    104087823 A    10/2014
CN    104328342 A    2/2015
(Continued)

OTHER PUBLICATIONS

"Methods of measurement of the magnetic properties of magnetic steel sheet and strip by means of a single sheet tester", JIS C 2556, 2015, total 254 pages.
(Continued)

*Primary Examiner* — Daniel J. Schleis
*Assistant Examiner* — Kevin C T Li
(74) *Attorney, Agent, or Firm* — Birch, Stewart, Kolasch & Birch, LLP

(57) ABSTRACT

A non-oriented electrical steel sheet includes a silicon steel sheet and an insulation coating. When t is a thickness of the silicon steel sheet and when PDR is defined as (PDR=(maximum−minimum)/minimum×100) which indicates a ratio concerned with maximum and minimum of number densities of AlN precipitates in three areas which are $\frac{1}{10}$t
(Continued)

area, ⅛t area, and ½t area from a surface of the silicon steel sheet along a thickness direction, the PDR is 50% or less.

5 Claims, 3 Drawing Sheets

(51) Int. Cl.
    *C21D 8/12*     (2006.01)
    *C21D 9/46*     (2006.01)
    *C22C 38/00*     (2006.01)
    *C22C 38/02*     (2006.01)
    *C22C 38/04*     (2006.01)
    *C22C 38/06*     (2006.01)
    *C22C 38/16*     (2006.01)
    *H01F 1/147*     (2006.01)

(52) U.S. Cl.
    CPC ......... *C21D 8/1222* (2013.01); *C21D 8/1233* (2013.01); *C21D 8/1272* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/16* (2013.01); *H01F 1/14775* (2013.01); *C22C 2202/02* (2013.01)

(58) Field of Classification Search
    CPC .. C21D 8/1233; C21D 8/1272; C21D 8/1261; C21D 8/1283; C21D 1/26; C22C 38/001; C22C 38/002; C22C 38/004; C22C 38/005; C22C 38/008; C22C 38/02; C22C 38/04; C22C 38/06; C22C 38/16; C22C 2202/02; H01F 1/14775; H01F 1/16; H01F 1/147; Y02P 10/20
See application file for complete search history.

(56) References Cited

U.S. PATENT DOCUMENTS

| | | | |
|---|---|---|---|
| 2015/0013844 A1* | 1/2015 | Xie | .......................... C21D 9/46 148/111 |
| 2015/0357101 A1 | 12/2015 | Zaizen et al. | |
| 2016/0273064 A1 | 9/2016 | Kataoka et al. | |
| 2017/0226622 A1* | 8/2017 | Shingaki | ................... C23C 8/02 |
| 2018/0030558 A1 | 2/2018 | Okubo et al. | |

FOREIGN PATENT DOCUMENTS

| | | | |
|---|---|---|---|
| CN | 106661656 A | | 5/2017 |
| CN | 107164690 A | | 9/2017 |
| JP | 58-23410 A | | 2/1983 |
| JP | 3-223424 A | | 10/1991 |
| JP | 5-279740 A | | 10/1993 |
| JP | 6-279859 A | | 10/1994 |
| JP | 6-306467 A | | 11/1994 |
| JP | 11-124626 A | | 5/1999 |
| JP | 2000-129409 A | | 5/2000 |
| JP | 2001-98329 A | | 4/2001 |
| JP | 2002-348644 A | | 12/2002 |
| JP | 2006-45613 A | | 2/2006 |
| JP | 2006-45641 A | | 2/2006 |
| JP | 2006-219692 A | | 8/2006 |
| JP | 2011-111658 A | | 6/2011 |
| JP | 2013-104080 A | | 5/2013 |
| JP | 2018-21242 A | | 2/2018 |
| JP | 2018021242 A | * | 2/2018 |
| KR | 10-2011-0005583 A | | 1/2011 |
| TW | 201446977 A | | 12/2014 |
| WO | WO 2012/029621 A1 | | 3/2012 |
| WO | WO 2014/129034 A1 | | 8/2014 |
| WO | WO 2016/136095 A1 | | 9/2016 |

OTHER PUBLICATIONS

International Search Report for PCT/JP2019/011749 dated Jun. 11, 2019.
Notice of Allowance for TW 108109554 dated Oct. 7, 2019.

\* cited by examiner

NON-ORIENTED ELECTRICAL STEEL SHEET

TECHNICAL FIELD

The present invention relates to a non-oriented electrical steel sheet.

Priority is claimed on Japanese Patent Application No. 2018-056310, filed on Mar. 23, 2018, and the content of which is incorporated herein by reference.

BACKGROUND ART

In recent years, especially in the field of electrical equipment such as rotating machines, small and medium-size transformers, and electrical components, it is eagerly demanded for a motor to enhance the efficiency and to reduce the size, due to the movement of global environmental conservation represented by global power reduction, energy saving, and $CO_2$ emission reduction. Under the social situation, it is demanded to improve the performance for the non-oriented electrical steel sheet used as motor core materials.

For example, in the automotive field, the non-oriented electrical steel sheet is used as the core of drive motor for hybrid drive vehicles (HEV: Hybrid Electric Vehicle) and the like. Moreover, it is demanded to reduce the size of drive motor used in HEV in order to save installation space and to reduce fuel consumption by weight reduction.

To reduce the size of drive motor, it is necessary to increase the torque of motor. Thus, it is demanded to further improve the magnetic flux density of the non-oriented electrical steel sheet.

In addition, since the battery capacity that can be mounted on the automobile is limited, it is needed to reduce the energy loss in the motor. Thus, it is demanded to further decrease the iron loss of the non-oriented electrical steel sheet.

In addition, the electrical steel sheet is often used after being formed to target shape and heat-treated. Representatively, "strain relief annealing (SRA)" is known. For example, when the steel sheet is subjected to punching process to being formed to electric materials, the strain is inevitably introduced into the steel sheet, and thereby the iron loss deteriorates. The SRA is the heat treatment for finally removing the unnecessary strain from the steel sheet. This heat treatment is conducted for the pieces cut out from the steel sheet (steel sheet blank) or the motor core (for example, stator core) in which the pieces are laminated.

However, the strain relief annealing (SRA) has the effect of improving the iron loss by releasing the strain, but at the same time, causes the decrease in magnetic flux density by developing the unfavorable crystal orientation for magnetic characteristics. Thus, in a case where excellent magnetic characteristics are necessary, it is demanded to suppress the decrease in magnetic flux density caused by the strain relief annealing (SRA).

In view of the above-mentioned situations, in order to improve the magnetic characteristics of the non-oriented electrical steel sheet, various efforts have been made, for example, the control of metallic structure such as grain size and crystal orientation in the steel sheet, the control of precipitates, and the like (ex. Patent Documents 1 to 13).

RELATED ART DOCUMENTS

Patent Documents

[Patent Document 1] Japanese Unexamined Patent Application, First Publication No. H05-279740

[Patent Document 2] Japanese Unexamined Patent Application, First Publication No. H06-306467

[Patent Document 3] Japanese Unexamined Patent Application, First Publication No. 2002-348644

[Patent Document 4] Japanese Unexamined Patent Application, First Publication No. 2011-111658

[Patent Document 5] Japanese Unexamined Patent Application, First Publication No. 2006-045613

[Patent Document 6] Japanese Unexamined Patent Application, First Publication No. 2006-045641

[Patent Document 7] Japanese Unexamined Patent Application, First Publication No. 2006-219692

[Patent Document 8] Japanese Unexamined Patent Application, First Publication No. S58-23410

[Patent Document 9] Japanese Unexamined Patent Application, First Publication No. H11-124626

[Patent Document 10] PCT International Publication No. WO2012/029621

[Patent Document 11] PCT International Publication No. WO2016/136095

[Patent Document 12] Japanese Unexamined Patent Application, First Publication No. H03-223424

[Patent Document 13] PCT International Publication No. WO2014/129034

SUMMARY OF INVENTION

Technical Problem to be Solved

Patent Document 1 discloses a non-oriented electrical steel sheet obtained through processes such that a steel strip with specific chemical composition including $4.0\%<Si\leq8.0\%$ and $Al\leq2.0\%$ in mass % is cold-rolled under the reduction of 5% or more and less than 40%.

Patent Document 2 discloses a non-oriented electrical steel sheet obtained through processes such that a steel strip with specific chemical composition including $Si\leq4.0\%$ and $Al\leq2.0\%$ in mass % is cold-rolled under the reduction of 5% or more and less than 40%.

However, the non-oriented electrical steel sheets disclosed in Patent Documents 1 and 2 do not satisfy the demanded level for the core of drive motor for HEV in which excellent magnetic characteristics are demanded.

Patent Document 3 discloses a non-oriented electrical steel sheet in which the chemical composition includes $Si\leq4.0\%$ and the like, the magnetic flux density $B_{25}$ under magnetic field strength of 2500 A/m is 1.70 T or more, and the magnetic flux density $B_{50}$ under magnetic field strength of 5000 A/m is 1.80 T or more. However, the non-oriented electrical steel sheet disclosed in Patent Document 3 limits the Al content to 0.5 mass % or less in order not to adversely affect the improvement of magnetic flux density (B25) in low magnetic field, and thus the electrical steel sheet does not satisfy the demanded level as excellent magnetic characteristics.

Patent Document 4 discloses a non-oriented electrical steel sheet which is produced under specific conditions such that the chemical composition includes $0.1\%<Si\leq2.0\%$, $Al\leq1.0\%$, and the like and the finish temperature of final hot rolling is 550 to 800° C. However, the electrical steel sheet limits the Al content to 1.0 mass % or less, and thus does not satisfy the demanded level as excellent magnetic characteristics. Moreover, even when the hot rolling is conducted under the lower temperature such as 500 to 850° C., the expected effect is not obtained.

Patent Documents 5 to 7 disclose a non-oriented electrical steel sheet in which the chemical composition includes 0.05 to 4.0 mass % (or 4.5 mass %) of Si, 3.5 mass % or less of Al, and the like, the magnetic characteristics along the direction making an angle of 45° with rolling direction are excellent, and the in-plane anisotropy is small.

However, the techniques disclosed in Patent Documents 5 to 7 are similar to that of Patent Document 4 in which the hot rolling is conducted under the lower temperature such as 500 to 850° C. Even when the hot rolling is conducted under the lower temperature, the expected effect is not obtained, and the electrical steel sheets do not satisfy the demanded level as excellent magnetic characteristics. Moreover, the techniques disclosed in Patent Documents 5 to 7 do not satisfy the demanded level for high-frequency iron loss.

Patent Document 8 discloses a technique to improve the magnetic characteristics by controlling the heating rate of final annealing to 10° C./sec or more for the steel sheet with the chemical composition including 2.5% or more of Si and 1.0% or more of Al in mass %. However, in the present process based on continuous annealing, the heating rate as mentioned above may be in general technical range.

Patent Document 9 discloses a technique to prevent the iron loss from deteriorating by decreasing the heating rate of final annealing to 40° C./sec, because the iron loss deteriorates when the heating rate of final annealing is excessively fast.

Patent Document 10 discloses a technique to enhance the magnetic flux density by controlling the texture by drastically increasing the heating rate of final annealing to 100° C./sec. However, when the heating rate is simply increased, the magnetic characteristics may become unstable.

Patent Document 11 discloses a technique to prevent the magnetic flux density from being unstable by optimizing the heating rate in the respective temperature ranges of 600 to 700° C. and 700 to 760° C., because the magnetic flux density becomes unstable when the heating rate of final annealing is fast.

Patent Documents 12 and 13 disclose techniques relating to semi-processed non-oriented electrical steel sheets. The semi-processed non-oriented electrical steel sheets are shipped under the condition such that the strain is introduced into the recrystallized steel sheet after final annealing, and then subjected to the heat treatment by the steel sheet user to release the strain and to control the magnetic characteristics.

In particular, Patent Document 12 shows that it is effective to control the heating rate of final annealing to 5 to 40° C./sec in consideration of Al nitrides. In addition, Patent Document 13 discloses a technique to improve the magnetic characteristics for semi-processed electrical steel sheets by increasing the heating rate up to 740° C. to 100° C./sec or more for the low Al steel.

However, the conventional techniques have not been able to sufficiently satisfy the above-mentioned needs such as the high-frequency characteristics and the magnetic characteristics after the strain relief annealing (SRA) in the present market.

As described above, the non-oriented electrical steel sheets disclosed in Patent Documents 1 to 13 are not able to sufficiently satisfy the demanded magnetic characteristics.

Since the conventional non-oriented electrical steel sheets are not sufficiently satisfy the demanded level as excellent magnetic characteristics, it is demanded to further improve the magnetic characteristics.

The present invention has been made in consideration of the above mentioned situations. An object of the invention is to provide a non-oriented electrical steel sheet with small change in magnetic flux densities $B_{50}$ before and after the strain relief annealing (SRA).

Solution to Problem

The present inventors have made a thorough investigation to solve the above mentioned situations. As a result, it is found that, when the AlN precipitates uniformly in the base steel sheet (silicon steel sheet) along the thickness direction, the magnetic characteristics tend not to deteriorate even when the strain relief annealing is conducted. In particular, it is found that the change in magnetic characteristics before and after the strain relief annealing is small in regard to the three directions which are the rolling direction, the transverse direction, and the rolling 45° direction (the direction making an angle of 45° with the rolling direction) for the motor core.

Hereinafter, in the sheet surface, "0°" indicates the direction along the rolling direction, "90°" indicates the direction perpendicular to the rolling direction, and "45°" indicates the direction making an angle of 45° with the rolling direction.

In addition, the present inventors have investigated producing conditions to obtain the silicon steel sheet in which the AlN precipitates uniformly along the thickness direction. As a result, it is found that the silicon steel sheet with the above feature is obtained by conducting the incubation treatment and by controlling the heating rate of final annealing. Herein, the incubation treatment is to control the temperature and the time to be within the predetermined range during cooling after final hot rolling, instead of the hot-band annealing after final hot rolling which is conducted to produce the conventional non-oriented electrical steel sheet.

An aspect of the present invention employs the following.

(1) A non-oriented electrical steel sheet according to an aspect of the present invention includes a silicon steel sheet and an insulation coating, wherein the silicon steel sheet includes, as a chemical composition, by mass %, 0.01 to 3.50% of Si,
0.0010 to 2.500% of Al,
0.01 to 3.00% of Mn,
0.0030% or less of C,
0.180% or less of P,
0.0030% or less of S,
0.0030% or less of N,
0.0020% or less of B, and
a balance consisting of Fe and impurities, and when t is a thickness of the silicon steel sheet and when PDR is defined as a following (expression 1) which indicates a ratio concerned with maximum and minimum of number densities of AlN precipitates in three areas which are 1/10t area, 1/5t area, and 1/2t area from a surface of the silicon steel sheet along a thickness direction, the PDR is 50% or less.

wherein the PDR=(the maximum−the minimum)÷the minimum×100     (expression 1).

(2) In the non-oriented electrical steel according to (1), the silicon steel sheet includes, as the chemical composition, by mass %, at least one selected from a group consisting of 0.0500% or less of Sb, and
0.0100 to 0.2000% of Sn.

(3) In the non-oriented electrical steel according to (1) or (2), the silicon steel sheet includes, as the chemical composition, by mass %, at least one selected from a group consisting of 0 to 1.00% of Cu,
0 to 0.0400% of REM,
0 to 0.0400% of Ca, and
0 to 0.0400% of Mg.

Effects of Invention

According to the above aspects of the present invention, it is possible to provide the non-oriented electrical steel sheet with small change in magnetic flux densities before and after the strain relief annealing (SRA). In particular, it is possible to provide the non-oriented electrical steel sheet in which the difference between the magnetic flux density $B_{50}$ before strain relief annealing and the magnetic flux density $B_{50}$ after strain relief annealing is 0.010 T or less, in regard to the average of three directions which are the rolling direction, the transverse direction, and the rolling 45° direction.

DETAILED DESCRIPTION OF PREFERRED EMBODIMENTS

Hereinafter, a preferable embodiment of the present invention is described in detail. However, the present invention is not limited only to the configuration which is disclosed in the embodiment, and various modifications are possible without departing from the aspect of the present invention. In addition, the limitation range as described below includes a lower limit and an upper limit thereof. However, the value expressed by "more than" or "less than" does not include in the limitation range. "%" of the amount of respective elements expresses "mass %".

Figure 1:
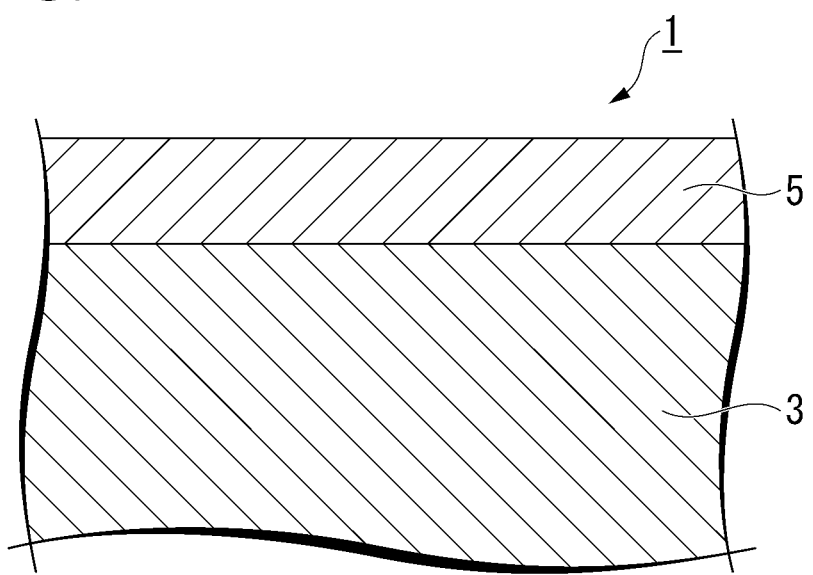
FIG. 1 is a cross-sectional illustration of a non-oriented electrical steel sheet according to an embodiment of the present invention.

A non-oriented electrical steel sheet according to the embodiment includes a silicon steel sheet as base steel sheet and an insulation coating arranged on the silicon steel sheet. FIG. 1 is a cross-sectional illustration of the non-oriented electrical steel sheet according to the embodiment. The non-oriented electrical steel sheet 1 according to the embodiment includes the silicon steel sheet 3 and the insulation coating 5 when viewing a cross section whose cutting direction is parallel to a thickness direction.

<Non-Oriented Electrical Steel Sheet>

The silicon steel sheet of the non-oriented electrical steel sheet according to the embodiment includes, as a chemical composition, by mass %, 0.0030% or less of C, 0.01 to 3.50% of Si, 0.0010 to 2.500% of Al, 0.01 to 3.00% of Mn, 0.180% or less of P, 0.0030% or less of S, 0.0030% or less of N, 0.0020% or less of B, and a balance consisting of Fe and impurities.

In addition, in the non-oriented electrical steel sheet according to the embodiment, the difference of the magnetic flux densities $B_{50}$ before and after the strain relief annealing may be 0.010 T or less in regard to the average of three directions which are the rolling direction, the transverse direction, and the rolling 45° direction, when the steel sheet is excited under magnetic field strength of 5000 A/m. The detail is explained below.

(Distribution State of Precipitates in Silicon Steel Sheet)

When t is a thickness of the silicon steel sheet in units of mm and when PDR is a ratio concerned with maximum and minimum of number densities of AlN precipitates in three areas which are a location of ⅒t from a surface of the silicon steel sheet along the thickness direction (⅒t area), a location of ⅕t from the surface (⅕t area), and a location of ½t from the surface (½t area), the PDR is 50% or less.

The PDR=(the maximum of number densities in the three areas−the minimum of number densities in the three areas)÷the minimum of number densities in the three areas×100

Specifically, when t is the thickness of the silicon steel sheet in units of mm, NDmax is the maximum of AlN number densities in units of piece/μm² in three areas which are ⅒t area, ⅕t area, and ½t area from the surface of the silicon steel sheet along the thickness direction, NDmin is the minimum of AlN number densities in units of piece/μm² in three areas, and PDR is AlN distribution state in units of % (herein, PDR=(NDmax−NDmin)÷NDmin×100), PDR is 50% or less.

The upper limit of PDR is preferably 40% and more preferably 30% in order to control the AlN distribution state to be uniform. On the other hand, the lower limit of PDR is not particularly limited and may be 0%. However, it is not easy to control PDR to 0%, the lower limit of PDR may be 2% and may be 5%.

The {111} recrystallized grains that deteriorate the magnetic flux density tend to mainly develop in ½t area, and the {100} recrystallized grains that improve the magnetic flux density tend to mainly develop in ⅒t area. In the conventional non-oriented electrical steel sheets, since the amount of AlN is insufficient in ½t area, the {111} recrystallized grains grow during the strain relief annealing, and thereby the magnetic flux density deteriorates. In the embodiment, it seems that AlN is to be precipitated in ½t area, the growth of {111} recrystallized grains is suppressed, and thereby the deterioration of magnetic flux density due to strain relief annealing is suppressed within 0.010 T. Therefore, the distribution of number densities of AlN precipitates in the thickness direction is defined as PDR.

AlN in the silicon steel sheet may be measured by the following method. A steel sample with approximately 30 mm×30 mm×0.3 to 0.5 mm is cut out from the steel sheet, and the cross section thereof is mechanical-polished and chemical-polished. An electron beam is irradiated the cross-sectional specimen with, a characteristic X-ray is detected by microanalyzer, and thereby the number density of AlN is measured.

Specifically, a sample with approximately 30 mm×30 mm is cut out from the steel sheet, a thickness of the sample is reduced by mechanical-polishing a sheet surface, and thereby ⅒t area, ⅕t area, and ½t area are respectively exposed when t is the thickness of the silicon steel sheet. The exposed surfaces are chemical-polished or electrolytic-polished, and thereby observed samples without strain are obtained. The existence and number of AlN are confirmed by observing the samples. The number densities can be obtained in units of piece/μm' from the number of AlN existing in observed visual field (observed area).

In order to identify AlN existing in the observed visual field, the precipitate in which the atomic ratio of Al and N is approximately 1:1 may be identified in the observed visual field, based on the quantitative analysis result of EPMA (Electron Probe Micro-Analyzer). The number density and PDR may be obtained by identifying AlN existing in the observed visual field (observation area).

The fine AlN which is difficult to identify by EPMA, for example the AlN with the diameter of 300 nm or less, may be identified by TEM-EDS (Transmission Electron Microscope-Energy Dispersive X-ray Spectroscopy). The samples for TEM observation (ex. approximately 15 mm×15 mm) are taken from 1/10t area, 1/5t area, and 1/2t area. The precipitate in which the atomic ratio of Al and N is approximately 1:1 may be identified in the observed visual field, based on the quantitative analysis result of TEM-EDS. The number density and PDR may be obtained by identifying AlN existing in the observed visual field (observation area).

(Chemical Composition of Silicon Steel Sheet)

Next, the limitation reasons in regard to the chemical composition of the silicon steel sheet of the non-oriented electrical steel sheet according to the embodiment is described. "%" related to the compositions of the steel sheet expresses "mass %".

In the embodiment, the silicon steel sheet includes, as a chemical composition, base elements, optional elements as necessary, and a balance consisting of Fe and impurities.

The base elements correspond to main alloying elements of the silicon steel sheet. In the embodiment, the base elements are Si, Al, and Mn.

In addition, the impurities correspond to elements which are contaminated during industrial production of the steel from ores and scrap that are used as a raw material of the steel, or from environment of a production process. For example, the impurities are elements such as C, P, S, N, and B. It is preferable that the amount of impurities is limited in order to sufficiently obtain the effects of the embodiment. Moreover, since it is preferable that the amount of respective impurities is low, a lower limit of the respective impurities does not need to be limited, and the lower limit may be 0%.

In addition, the optional elements correspond to elements which may be included as substitution for a part of Fe which is the balance. For example, the optional elements are elements such as Sn, Sb, Cu, REM, Ca, and Mg. The optional elements may be included as necessary. Thus, a lower limit of the respective optional elements does not need to be limited, and the lower limit may be 0%. Moreover, even if the optional elements may be included as impurities, the above mentioned effects are not affected.

Specifically, it is preferable that the silicon steel sheet of the non-oriented electrical steel sheet according to the embodiment includes, as a chemical composition, by mass %, 0.0030% or less of C, 0.01 to 3.50% of Si, 0.0010 to 2.500% of Al, 0.01 to 3.00% of Mn, 0.180% or less of P, 0.0030% or less of S, 0.0030% or less of N, 0.0020% or less of B, 0 to 0.0500% of Sb, 0 to 0.2000% of Sn, 0 to 1.00% of Cu, 0 to 0.0400% of REM, 0 to 0.0400% of Ca, 0 to 0.0400% of Mg, and a balance consisting of Fe and impurities.

0.0030% or Less of C

C (carbon) is the element which deteriorates the iron loss and the impurity which causes the magnetic aging. The C content is preferably as small as possible. Thus, the C content is to be 0.0030% or less. The upper limit of C content is preferably 0.0025% and more preferably 0.0020%. The lower limit of C content is not particularly limited. The C content may be 0.0001% or more in consideration of industrial purification in practice, and may be 0.0005% or more in consideration of production cost.

0.01 to 3.50% of Si

When the Si (silicon) content is excessive, the magnetic flux density decreases, the hardness increases, and the punching workability deteriorates. Moreover, during the producing process of the non-oriented electrical steel sheet, the operability such as cold rolling deteriorates, the production cost increases, and the possibility of rupture increases. Thus, the upper limit of Si content is to be 3.50%. The upper limit of Si content is preferably 3.20% and more preferably 3.00%. On the other hand, Si has the effect of reducing eddy current loss by increasing the electrical resistance of steel sheet, and thereby reducing the iron loss. Thus, the lower limit of Si content is to be 0.01%. The lower limit of Si content is preferably 0.10%, more preferably 0.50%, furthermore preferably 1.00%, furthermore preferably more than 2.00%, furthermore preferably 2.10%, and furthermore preferably 2.30%.

0.0010 to 2.500% of Al

Al (aluminum) is inevitably contained in ores and refractories, and is also used for deoxidation. Considering the above, the lower limit of Al content is to be 0.0010%. Moreover, in common with Si, Al is the element which has the effect of reducing the eddy current loss by increasing the electrical resistance, and thereby reducing the iron loss. Thus, Al may be contained in an amount of 0.200% or more. The Al content may be preferably more than 0.50% and more preferably 0.60% or more. On the other hand, when the Al content is excessive, the saturation magnetic flux density decreases and thereby the magnetic flux density decreases. Thus, the upper limit of Al content is to be 2.500%. The Al content is preferably 2.000% or less.

0.01 to 3.00% of Mn

Mn (manganese) reduces the eddy current loss by increasing the electrical resistance, and suppresses the formation of {111} <112> texture which is undesirable for magnetic characteristics. For the purposes, Mn is contained in an amount of 0.01% or more. The lower limit of Mn content is preferably 0.15%, more preferably 0.40%, furthermore preferably more than 0.60%, and furthermore preferably 0.70%. However, when the Mn content is excessive, the texture changes, and the hysteresis loss deteriorates. Thus, the upper limit of Mn content is to be 3.00%. The upper limit of Mn content is preferably 2.50% and more preferably 2.00%.

0.180% or Less of P

P (phosphorus) is the impurity which may increase the tensile strength without decreasing the magnetic flux density, but deteriorates the toughness of steel and tends to cause the rupture of steel sheet. Thus, the upper limit of P content is to be 0.180%. The P content is preferably as small as possible in order to suppress the rupture of steel sheet. The upper limit of P content is preferably 0.150%, more preferably 0.120%, and furthermore preferably 0.080%. The lower limit of P content is not particularly limited, and may be 0.001% in consideration of production cost.

0.0030% or Less of S

S (sulfur) is the impurity which suppresses the recrystallization and the grain growth during final annealing by precipitating fine sulfides such as MnS. Thus, the S content is to be 0.0030% or less. The upper limit of S content is preferably 0.0020% and more preferably 0.0015%. The lower limit of S content is not particularly limited. The lower limit of S content may be 0.0001% in consideration of industrial purification in practice and may be 0.0005% in consideration of production cost.

0.0030% or Less of N

N (nitrogen) is the impurity which deteriorates the iron loss by forming precipitates. Thus, the N content is to be 0.0030% or less. The N content is preferably 0.002% or less and more preferably 0.001% or less. The lower limit of N content is not particularly limited. The lower limit of N content may be 0.0001% in consideration of industrial purification in practice and may be 0.0005% in consideration of production cost.

0.0020% or Less of B

B (boron) is the impurity which deteriorates the iron loss by forming precipitates. Thus, the B content is to be 0.0020% or less. The B content is preferably 0.001% or less and more preferably 0.0005% or less. The lower limit of B content is not particularly limited. The lower limit of B content may be 0.0001% in consideration of industrial purification in practice and may be 0.0005% in consideration of production cost.

0 to 0.0500% of Sb

The addition of Sb (antimony) contributes to the suppression of surface nitridation and the improvement of iron loss. On the other hand, when the Sb content is excessive, the toughness of steel may deteriorate. Thus, the upper limit of Sb content is to be 0.0500%. The Sb content is preferably 0.03% or less and more preferably 0.01% or less. The lower limit of Sb content is not particularly limited, and may be 0%. The Sb content may be 0.001% or more in order to obtain the above effects preferably.

0 to 0.2000% of Sn

The addition of Sn (tin) contributes to the suppression of surface nitridation and the improvement of iron loss. On the other hand, when the Sn content is excessive, the toughness of steel may deteriorate, and the insulation coating may easily delaminate. Thus, the upper limit of Sn content is to be 0.2000%. The Sn content is preferably 0.08% or less and more preferably 0.06% or less. The lower limit of Sn content is not particularly limited, and may be 0%. The Sn content may be 0.01% or more in order to obtain the above effects preferably. The Sn content is preferably 0.04% or more and more preferably 0.08% or more.

0 to 1.00% of Cu

Cu (copper) is the element which has the effects of suppressing the formation of {111} <112> texture which is undesirable for magnetic characteristics, of suppressing the oxidation of steel sheet surface, and of controlling the grain growth to be uniform. When the Cu content exceeds 1.00%, the effects of addition are saturated, the grain growth during final annealing is suppressed, the workability of steel sheet deteriorates, and the steel sheet becomes brittle during cold rolling. Thus, the Cu content is to be 1.00% or less. The Cu content is preferably 0.60% or less and more preferably 0.40% or less. The lower limit of Cu content is not particularly limited, and may be 0%. The Cu content may be 0.10% or more in order to obtain the above effects preferably. The Cu content is preferably 0.20% or more and more preferably 0.30% or more.

0 to 0.0400% of REM
0 to 0.0400% of Ca
0 to 0.0400% of Mg

REM (Rare Earth Metal), Ca (calcium), and Mg (magnesium) are the elements which have the effects of fixing S as sulfides or oxysulfides, of suppressing the fine precipitation of MnS and the like, and of promoting the recrystallization and grain growth during final annealing.

When REM, Ca, and Mg exceed 0.0400%, the sulfides or oxysulfides are excessively formed, and the recrystallization and grain growth during final annealing are suppressed. Thus, the REM content, the Ca content, and the Mg content are to be 0.0400% or less respectively. The respective contents are preferably 0.0300% or less and more preferably 0.0200% or less.

The lower limits of REM content, Ca content, and Mg content are not particularly limited, and may be 0%. The REM content, the Ca content, and the Mg content may be 0.0005% or more in order to obtain the above effects preferably. The respective contents are preferably 0.0010% or more and more preferably 0.0050% or more.

Herein, REM indicates a total of 17 elements of Sc, Y and lanthanoid, and is at least one of them. The above REM content corresponds to the total content of at least one of these elements. Industrially, misch metal is added as the lanthanoid.

In the embodiment, it is preferable that the silicon steel sheet includes, as the chemical composition, by mass %, at least one selected from the group consisting of 0.001 to 0.0500% or less of Sb, 0.01 to 0.2000% of Sn, 0.10 to 1.00% of Cu, 0.0005 to 0.0400% of REM, 0.0005 to 0.0400% of Ca, or 0.0005 to 0.0400% of Mg.

The above chemical composition is that of the silicon steel sheet. When the non-oriented electrical steel sheet to be the measurement sample has the insulation coating and the like on the surface, the measurement is performed after removing the coating.

As a method for removing the insulation coating and the like of the non-oriented electrical steel sheet, for example, the following method is exemplified.

First, the non-oriented electrical steel sheet having the insulation coating and the like is immersed in sodium hydroxide aqueous solution, sulfuric acid aqueous solution, and nitric acid aqueous solution in this order. The steel sheet after the immersion is washed. Finally, the steel sheet is dried with warm air. Thereby, it is possible to obtain the silicon steel sheet from which the insulation coating as described later is removed.

The steel composition as described above may be measured by typical analytical methods for steel. For example, the steel composition may be measured by using ICP-AES (Inductively Coupled Plasma-Atomic Emission Spectrometer: inductively coupled plasma emission spectroscopy spectrometry). In addition, C and S may be measured by the infrared absorption method after combustion, N may be measured by the thermal conductometric method after fusion in a current of inert gas, and O may be measured by, for example, the non-dispersive infrared absorption method after fusion in a current of inert gas.

(Magnetic Characteristics of Non-Oriented Electrical Steel Sheet)

The non-oriented electrical steel sheet according to the embodiment shows excellent magnetic characteristics in regard to the three directions which are the rolling direction, the transverse direction, and the rolling 45° direction for the motor core.

In regard to the average magnetic flux density $B_{50}$ of three directions as described above in a case where the steel sheet is excited under magnetic field strength of 5000 A/m, the deterioration of magnetic flux density $B_{50}$ due to strain relief annealing may be 0.010 T or less.

Specifically, when the magnetic flux density $B_{50}$ is defined as the average of the magnetic flux density of rolling direction, the magnetic flux density of transverse direction, and the magnetic flux density of rolling 45° direction in a case where the steel sheet is excited under magnetic field strength of 5000 A/m, it is preferable that the absolute value of the difference between the magnetic flux density $B_{50}$ before strain relief annealing and the magnetic flux density $B_{50}$ after strain relief annealing is 0.010 T or less.

The difference between the magnetic flux densities $B_{50}$ before and after strain relief annealing is preferably 0.008 T or less, more preferably 0.005 T or less, and furthermore preferably 0.002 T or less. The lower limit of the difference between the magnetic flux densities $B_{50}$ before and after strain relief annealing is not particularly limited, and the lower limit may be 0. The lower limit is preferably as close to 0 as possible. For example, the lower limit may be 0.001 T.

The {111} recrystallized grains that deteriorate the magnetic flux density tend to mainly develop in ½t area, and the {100} recrystallized grains that improve the magnetic flux density tend to mainly develop in ⅒t area. In the conventional non-oriented electrical steel sheets, since the amount of AlN is insufficient in ½t area, the {111} recrystallized grains grow preferentially during the strain relief annealing, and thereby the magnetic flux density deteriorates. In the embodiment, it seems that AlN is to be precipitated in ½t area, the grain growth kinetics of {100} grains and {111} grains becomes relatively almost the same, the orientation degree of {100} grains increases after strain relief annealing, and thereby the deterioration of magnetic flux density due to strain relief annealing is suppressed within 0.010 T or less.

The magnetic characteristics of electrical steel sheets may be measured based on the single sheet tester (SST) method regulated by JIS C 2556:2015. In the case of 0° and 90° directions, for example, a sample with 55 mm square in the rolling direction may be cut and taken, the steel sample may be excited under magnetic field strength of 5000 A/m, and then the magnetic flux densities along rolling direction and transverse direction may be measured in units of T (tesla). In the case of 45° direction, a sample with 55 mm square in the direction making an angle of 45° with rolling direction may be cut and taken, the magnetic flux densities along the length and width directions of the test piece may be measured, and the average thereof may be calculated. In addition, the steel sheet may be excited under conditions such that 50 Hz and the magnetic flux density of 1.5 T, and then the iron loss $W_{15/50}$ may be measured.

(Other Features of Non-Oriented Electrical Steel Sheet)

The thickness of silicon steel sheet of the non-oriented electrical steel sheet according to the embodiment may be appropriately adjusted depending on the intended use and the like, and is not particularly limited. The average thickness of silicon steel sheet may be 0.10 to 0.50 mm from a productive standpoint. The average thickness is preferably 0.15 to 0.50 mm. In particular, the average thickness is preferably 0.15 to 0.35 mm from the viewpoint of the balance between magnetic characteristics and productivity.

In addition, the non-oriented electrical steel sheet according to the embodiment may have an insulation coating on the surface of silicon steel sheet. The insulation coating formed on the surface of the non-oriented electrical steel sheet according to the embodiment is not particularly limited, and may be selected depending on the intended use and the like from the known coating.

For example, the insulation coating may be either an organic coating or an inorganic coating. Examples of the organic coating include: polyamine resins; acrylic resins; acrylic styrene resins; alkyd resins; polyester resins; silicone resins; fluorocarbon resins; polyolefin resins; styrene resins; vinyl acetate resins; epoxy resins; phenolic resins; urethane resins; melamine resins; and the like.

Examples of the inorganic coating include: phosphate-based coatings; aluminum phosphate-based coatings; and the like. Moreover, an organic-inorganic composite coating containing the above-mentioned resin is included.

The average thickness of insulation coating is not particularly limited. The average thickness is preferably 0.05 to 2 μm as an average thickness per one side.

<Producing Method for Non-Oriented Electrical Steel Sheet>

The non-oriented electrical steel sheet according to the embodiment is obtained, as mentioned above, by conducting the incubation treatment and by controlling the heating rate of final annealing. Herein, the incubation treatment is to control the temperature and the time to be within the predetermined conditions during cooling after final hot rolling, instead of the hot-band annealing after final hot rolling which is conducted to produce the conventional non-oriented electrical steel sheet.

Figure 2:
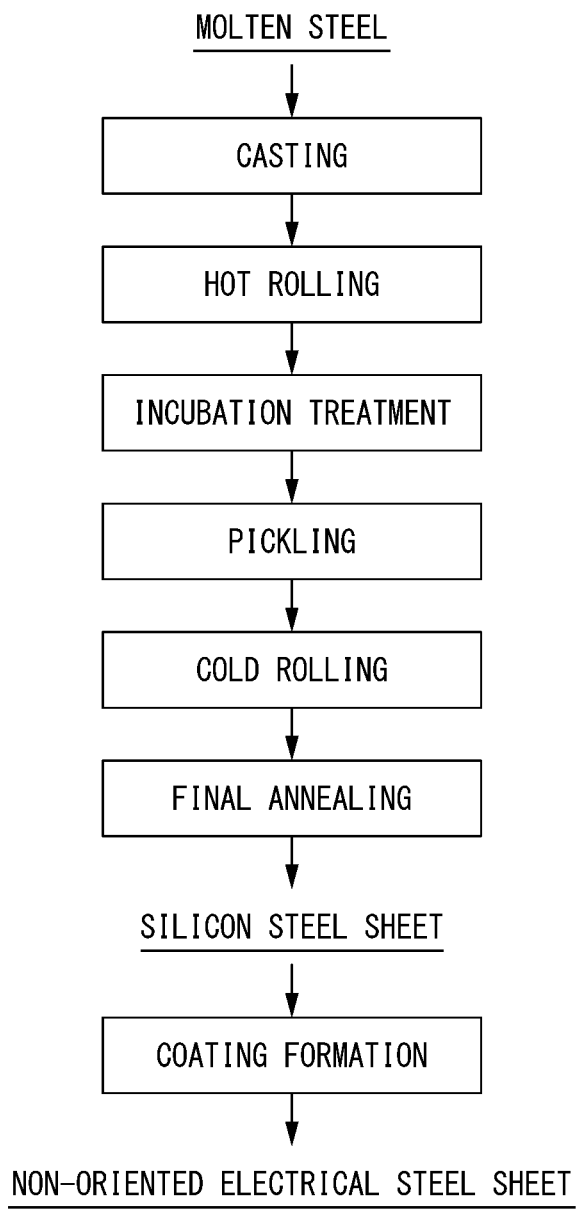
FIG. 2 is a flow chart illustrating a producing method for the non-oriented electrical steel sheet according to the embodiment.
Figure 3:
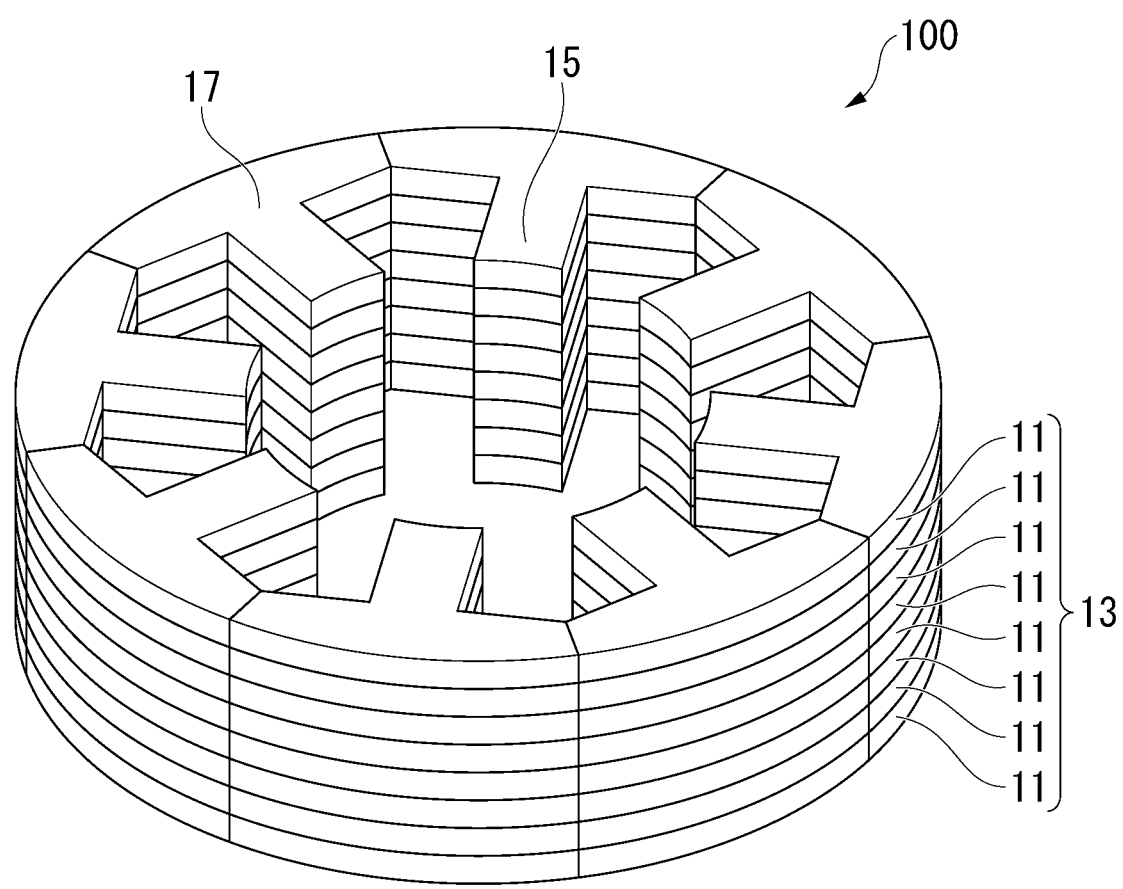
FIG. 3 is a perspective illustration showing an instance of motor core.

FIG. 2 is a flow chart illustrating a producing method for the non-oriented electrical steel sheet according to the embodiment. In the embodiment, the silicon steel sheet is obtained by casting molten steel with an adjusted composition, by being hot-rolled, by being incubated during cooling after hot rolling, by being pickled, by being cold-rolled, and then by being final-annealed. Further, the non-oriented electrical steel sheet is obtained by forming the insulation coating on the silicon steel sheet.

Hereinafter, an example of a preferred producing method for the non-oriented electrical steel sheet according to the embodiment is described.

The example of the preferred producing method for the non-oriented electrical steel sheet according to the embodiment includes:

a casting process of casting a slab including, in units of mass %, 0.0030% or less of C, 0.01 to 3.50% of Si, 0.0010 to 2.500% of Al, 0.01 to 3.00% of Mn, 0.180% or less of P, 0.0030% or less of S, 0.0030% or less of N, 0.0020% or less of B, 0 to 0.0500% of Sb, 0 to 0.2000% of Sn, 0 to 1.00% of Cu, 0 to 0.0400% of REM, 0 to 0.0400% of Ca, 0 to 0.0400% of Mg, and a balance consisting of Fe and impurities;

a hot rolling process of hot-rolling the slab;

an incubation process of incubating the steel sheet during cooling after hot rolling;

a pickling process of pickling the steel sheet;

a cold rolling process of cold-rolling the steel sheet; and a final annealing process of final-annealing the steel sheet after cold rolling.

In the incubation process, the incubation temperature is controlled to 700 to 950° C., and the incubation time is controlled to 10 minutes to 3 hours. In addition, in the final annealing process, the average heating rate during heating is controlled to 30 to 200° C./sec.

By satisfying the conditions of both two processes of the incubation process and the final annealing, it is possible to obtain, after the final annealing, the silicon steel sheet with 50% or less of the above PDR indicating the distribution state of AlN precipitates in three areas which are ⅒t area, ⅕t area, and ½t area. As a result, as the non-oriented electrical steel sheet, the difference in magnetic flux densities before and after strain relief annealing is suppressed to 0.010 T or less.

Hereinafter, main processes are explained.

(Hot Rolling Process)

The slab with the adjusted chemical composition is heated and hot-rolled. The heating temperature of the slab before hot rolling is not particularly limited. The heating temperature may be 1000 to 1300° C. in consideration of production cost and the like.

The slab after heating is rough-rolled, and then is final-rolled. At the time after the rough rolling and before the final rolling, the thickness of steel sheet is preferably 20 to 100 mm. Moreover, the finish temperature FT of final rolling is preferably 900° C. or more, and more preferably 950° C. or more. By controlling the finish temperature FT to 950° C. or more, the shear strain tends to be introduced, and thereby the {100} recrystallized grains may be increased after final annealing.

(Incubation Process)

The hot rolled steel sheet is incubated during cooling after hot rolling. In the incubation treatment, the incubation temperature is controlled to 700 to 950° C., and the incubation time (holding time) is controlled to 10 minutes to 3 hours. By controlling both of the incubation treatment and the final annealing as described later, the PDR is controlled to 50% or less, herein the PDR is the ratio concerned with maximum and minimum of number densities of AlN precipitates in three areas which are $\frac{1}{10}$t area, $\frac{1}{5}$t area, and $\frac{1}{2}$t area along the thickness direction. The reason why the incubation conditions affect AlN precipitates is not clear, but is considered as follows.

In the conventional producing method, the hot rolled steel sheet after hot rolling is coiled, the coil is cooled to room temperature without incubation, and thereafter the hot-band annealing is conducted in holding temperature of 950 to 1050° C. for holding time of 5 minutes or less in an atmosphere in which nitrogen and hydrogen are mixed. In the hot-band annealed sheet which annealed by the above conditions, AlN hardly precipitates in center area along the thickness direction of steel sheet.

On the other hand, in the embodiment, the hot rolled steel sheet during cooling after hot rolling is incubated in the temperature range of 700 to 950° C. for 10 minutes to 3 hours in the air containing a large amount of nitrogen. Thus, it seems that nitrogen intrudes into the center area along the thickness direction of steel sheet, and AlN is easily precipitated at the center area. In particular, by conducting the treatment under conditions such that the holding time of incubation is 10 minutes to 3 hours which is long time as compared with the conventional hot-band annealing, it is possible to uniformly precipitate AlN from the surface of steel sheet through the center area in the thickness direction.

For example, the incubation in the incubation treatment may be conducted by coiling the hot rolled steel sheet after hot rolling and by holding the coil in a coil cover or a coil box. At the time, the coil may be held in the incubation temperature. After the elapse of the predetermined incubation time, the coil may be taken from the coil cover or the coil box to finish the incubation.

(Cold Rolling Process)

The steel sheet after incubation treatment is cooled to room temperature, is pickled as required, and then is subjected to the cold rolling. The reduction of cold rolling is not particularly limited. As general conditions, the total reduction in cold rolling process (cumulative reduction of cold rolling) may be 75% or more (preferably 80% or more, more preferably 85% or more). The total reduction may be 90% or more in order to obtain a thin electrical steel sheet in particular. The total reduction in cold rolling is preferably 95% or less in consideration of production control such as rolling mill ability and thickness accuracy.

(Final Annealing Process)

The steel sheet after incubation treatment is subjected to the final annealing.

The average heating rate during heating in final annealing is to be 30 to 200° C./sec. By controlling the average heating rate, the PDR is controlled to 50% or less, herein the PDR is the ratio concerned with maximum and minimum of number densities of AlN precipitates in three areas which are $\frac{1}{10}$t area, $\frac{1}{5}$t area, and $\frac{1}{2}$t area along the thickness direction. The reason why the heating conditions affect AlN precipitates is not clear, but is considered as follows.

In the conventional producing method, particularly in the producing method in which the holding treatment is conducted during cooling after hot rolling without conducting the hot-band annealing, the average heating rate during heating in final annealing is limited to less than 30° C./sec in order to control the recrystallization structure and the grain size of steel sheet and to preferably reduce the number density of AlN in steel.

On the other hand, in the embodiment, the average heating rate during heating in final annealing is controlled to 30° C./sec or more. It seems that AlN in steel is easily dissolved during the final annealing, and is easily influenced by the heating rate during heating in particular. When the heating rate is less than 30° C./sec, the uniformity of AlN distribution in the thickness direction of steel sheet deteriorates because AlN in steel is easily dissolved and particularly AlN is unevenly dissolved depending on the depth of steel sheet. By controlling the average heating rate during heating in final annealing to 30° C./sec or more, it is possible to preferably control the PDR indicating the distribution state of AlN.

The average heating rate during heating in final annealing is preferably 40° C./sec or more and more preferably 50° C./sec or more. The upper limit of average heating rate is not particularly limited. The upper limit may be 200° C./sec for stable operation. The upper limit of average heating rate is preferably 100° C./sec. The average heating rate may be obtained based on the time required for heating from heating start temperature (room temperature) to holding temperature as described below.

In addition, by controlling the average heating rate during heating in final annealing to 30 to 200° C./sec, the orientation degree of {100} grains increases, and the orientation degree of {111} grains decreases, before strain relief annealing. Thus, the deterioration of magnetic flux density due to SRA is suppressed.

The holding temperature in final annealing may be 800 to 1200° C. in order to control the iron loss to be sufficiently low as final annealed. The holding temperature may be the recrystallization temperature or higher. When the holding temperature is 800° C. or more, the grains sufficiently grow, and thereby the iron loss can be reduced. In the same reason, the holding temperature is preferably 850° C. or more.

On the other hand, the upper limit of holding temperature may be 1200° C. in consideration of the load applied to the annealing furnace. The upper limit is preferably 1050° C.

In addition, the holding time in final annealing may be determined in consideration of grain size, iron loss, magnetic flux density, strength, and the like. For example, the holding time may be 5 seconds or more. On the other hand, when the holding time is 120 seconds or less, the grains appropriately grow. Thus, the holding time may be 5 to 120 seconds. When the holding time is within the range, the crystal orientation that has the effect of suppressing the deterioration of magnetic characteristics tends to remain even when the additional heat treatment of slow heating is conducted for the grain growth.

In addition, in a case where the additional heat treatment of slow heating such as strain relief annealing (SRA) is conducted at last, since the grains grow and the iron loss is reduced, the holding temperature in final annealing may be less than 800° C. In the case, the additional heat treatment leads significantly to suppressing the deterioration of magnetic flux density. In the case, even when the non-recrystallized structure partially remains, it is possible to obtain the specific crystal orientation for the non-oriented electrical steel sheet according to the embodiment. For example, the lower limit of holding temperature in final annealing may be 640° C. Since the steel sheet having fine structure or partially non-recrystallized structure by decreasing the holding temperature in final annealing shows high strength, the steel sheet is useful as high-strength non-oriented electrical steel sheet.

In order to obtain the non-oriented electrical steel sheet according to the embodiment, in addition to the above-described processes, the insulation coating formation process similarly to the conventional production process of non-oriented electrical steel sheet may be conducted to form the insulation coating on the surface of silicon steel sheet after final annealing process. Each condition of insulation coating formation process may employ the condition similarly to that of the conventional production process of non-oriented electrical steel sheet.

The method for forming the insulation coating is not particularly limited. For example, the insulation coating may be formed by preparing the solution for forming the insulation coating in which the resins or the inorganics as mentioned above is dissolved and by uniformly applying the solution for forming the insulation coating to the surface of silicon steel sheet, using known methods.

It is possible to obtain the non-oriented electrical steel sheet according to the embodiment by the producing method including the above processes.

According to the embodiment, it is possible to obtain the non-oriented electrical steel sheet excellent in magnetic characteristics. Thus, the non-oriented electrical steel sheet according to the embodiment is suitably applied as the various core materials for electrical equipment, particularly, the motor core materials such as rotating machines, small and medium-size transformers, and electrical components.

EXAMPLES

Hereinafter, the effects of an aspect of the present invention are described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

Silicon steel sheets were produced by using the slab with adjusted chemical composition and by controlling the production conditions in each process, and then the non-oriented electrical steel sheets were produced by forming the phosphoric acid based insulation coating with average thickness of 1 μm on the silicon steel sheet. The chemical compositions are shown in Tables 1 and 2, and the production conditions are shown in Tables 3 and 4. At the time of the above production, the rough hot rolling was conducted so that the thickness was 40 mm, and the cold rolling was conducted so that the thickness of all steel sheets after cold rolling was 0.35 mm.

The produced non-oriented electrical steel sheets were observed by the method described above, and AlN distribution along the thickness direction of silicon steel sheet was measured. The results are shown in Tables 5 and 6.

The magnetic flux density $B_{50}$ was measured using the produced non-oriented electrical steel sheets. The average magnetic flux density $B_{50}$ of three directions which were the rolling direction, the transverse direction, and the rolling 45° direction was measured before and after the strain relief annealing, and the difference $\Delta B_{50}$ before strain relief annealing and after strain relief annealing was measured. When the magnetic flux density $B_{50}$ before strain relief annealing was 1.58 T or more, it was judged to be acceptable. Moreover, when the difference $\Delta B_{50}$ was 0.010 T or less, it was judged to be acceptable.

Herein, the average magnetic flux density $B_{50}$ of three directions which were the rolling direction, the transverse direction, and the rolling 45° direction was measured based on the magnetic flux density excited under magnetic field strength of 5000 A/m. Specifically, the magnetic flux densities $B_{50}$ in regard to three directions which were the direction along rolling direction (0°), the direction perpendicular to rolling direction (90°), and the direction making an angle of 45° with rolling direction (45°) were measured, and the average was calculated in regard to three directions.

The iron loss $W_{15/50}$ was measured using the produced non-oriented electrical steel sheets. The average iron losses $W_{15/50}$ in regard to three directions which were the rolling direction, the transverse direction, and the rolling 45° direction were measured before and after the aging at 200° C. for 2 hours, and the difference $\Delta W_{15/50}$ before aging and after aging was measured. When the average iron loss $W_{15/50}$ before aging was 3.50 W/kg or less, it was judged to be acceptable. Moreover, when the difference $\Delta W_{15/50}$ was 0.4 W/kg or less, it was judged to be acceptable.

Herein, the magnetic flux density and the iron loss may be measured by the following method. A sample with 55 mm square may be cut and taken from the steel sheet, and then $B_{50}$ and $W_{17/50}$ may be measured by the single sheet tester (SST), herein $B_{50}$ indicating the magnetic flux density in units of T (tesla) when the steel sheet be excited under magnetic field strength of 5000 A/m, and $W_{17/50}$ indicating the iron loss when the steel sheet be excited under conditions such that 50 Hz and the magnetic flux density of 1.5 T.

The production conditions, the production results, and the evaluation results are shown in Tables 1 to 6. In the tables, the underlined value indicates out of the range of the present invention. Moreover, in the tables, "-" with respect to the chemical composition of silicon steel sheet indicates that no alloying element was intentionally added or that the content was less than detection limit.

As shown in the tables, in the inventive examples of Nos. B1 to B19, the composition of silicon steel sheet and the distribution state of AlN precipitates were preferably controlled, and thereby the magnetic characteristics were excellent for the non-oriented electrical steel sheet.

On the other hand, as shown in the tables, in the comparative examples of Nos. b1 to b17, at least one of the composition of silicon steel sheet and the distribution state of AlN precipitates was not preferably controlled, and thereby the magnetic characteristics were not satisfied for the non-oriented electrical steel sheet.

TABLE 1

| STEEL No. | CHEMICAL COMPOSITION OF SILICON STEEL SHEET (IN UNITS OF MASS %, BALANCE CONSISTING OF Fe AND IMPURITIES) | | | | | | | | | | | | | |
|---|---|---|---|---|---|---|---|---|---|---|---|---|---|---|
| | C | Si | Mn | Al | P | S | N | B | Sb | Sn | Cu | REM | Ca | Mg |
| A1 | 0.0029 | 0.01 | 2.7 | 0.25 | 0.01 | 0.0020 | 0.0021 | 0.0014 | — | — | — | — | — | — |
| A2 | 0.0028 | 3.5 | 1.1 | 0.35 | 0.03 | 0.0010 | 0.0022 | 0.0018 | — | — | — | — | — | — |
| A3 | 0.0027 | 3.2 | 0.01 | 0.45 | 0.07 | 0.0023 | 0.0023 | 0.0011 | — | — | — | — | — | — |
| A4 | 0.0025 | 1.2 | 3.0 | 0.5 | 0.09 | 0.0021 | 0.0019 | 0.0015 | — | — | — | — | — | — |
| A5 | 0.0023 | 3.0 | 0.2 | 0.001 | 0.1 | 0.0016 | 0.0014 | 0.0011 | — | — | — | — | — | — |
| A6 | 0.0019 | 2.95 | 0.2 | 0.45 | 0.18 | 0.0015 | 0.0015 | 0.0018 | — | — | — | — | — | — |
| A7 | 0.0016 | 2.1 | 0.2 | 0.30 | 0.17 | 0.0030 | 0.0022 | 0.0019 | — | — | — | — | — | — |
| A8 | 0.0015 | 1.8 | 0.04 | 0.90 | 0.15 | 0.0016 | 0.003 | 0.0011 | — | — | — | — | — | — |
| A9 | 0.0013 | 1.8 | 1.5 | 1.20 | 0.14 | 0.0017 | 0.0025 | 0.002 | — | — | — | — | — | — |
| A10 | 0.0011 | 1.7 | 1.4 | 1.20 | 0.14 | 0.0022 | 0.0022 | 0.0014 | 0.050 | — | — | — | — | — |
| A11 | 0.0009 | 1.5 | 1.2 | 1.80 | 0.02 | 0.0024 | 0.0022 | 0.0019 | — | 0.010 | — | — | — | — |
| A12 | 0.0007 | 1.5 | 1.1 | 0.012 | 0.05 | 0.0020 | 0.0026 | 0.0013 | — | 0.200 | — | — | — | — |
| A13 | 0.0007 | 1.1 | 0.2 | 1.5 | 0.09 | 0.0010 | 0.0022 | 0.0014 | 0.015 | 0.150 | — | — | — | — |
| A14 | 0.0005 | 0.4 | 0.3 | 2.0 | 0.14 | 0.0011 | 0.0012 | 0.0015 | 0.016 | 0.050 | — | — | — | — |
| A15 | 0.0017 | 2.3 | 0.3 | 0.35 | 0.02 | 0.0011 | 0.0021 | 0.0019 | — | — | 0.2 | — | — | — |
| A16 | 0.0015 | 2.4 | 0.3 | 0.34 | 0.03 | 0.0025 | 0.0023 | 0.0015 | — | — | — | 0.003 | — | — |
| A17 | 0.0019 | 2.3 | 0.2 | 0.39 | 0.02 | 0.0026 | 0.0020 | 0.0014 | — | — | — | — | 0.004 | — |
| A18 | 0.0021 | 2.2 | 0.3 | 0.33 | 0.04 | 0.0026 | 0.0018 | 0.0017 | — | — | — | — | — | 0.003 |

TABLE 2

| STEEL No. | CHEMICAL COMPOSITION OF SILICON STEEL SHEET (IN UNITS OF MASS %, BALANCE CONSISTING OF Fe AND IMPURITIES) | | | | | | | | | | | | | |
|---|---|---|---|---|---|---|---|---|---|---|---|---|---|---|
| | C | Si | Mn | Al | P | S | N | B | Sb | Sn | Cu | REM | Ca | Mg |
| a1 | <u>0.01</u> | 1.5 | 0.5 | 0.5 | 0.17 | 0.0024 | 0.0021 | 0.0018 | 0.010 | 0.012 | — | — | — | — |
| a2 | 0.001 | 0.5 | <u>4.5</u> | 0.9 | 0.02 | 0.0021 | 0.0026 | 0.0018 | 0.012 | 0.017 | — | — | — | — |
| a3 | 0.0015 | 2.2 | 1.5 | <u>0.0005</u> | 0.05 | 0.0016 | 0.0021 | 0.0014 | 0.018 | 0.018 | — | — | — | — |
| a4 | 0.0010 | 0.2 | 1.4 | <u>3.5</u> | 0.02 | 0.0015 | 0.0019 | 0.0015 | 0.012 | 0.012 | — | — | — | — |
| a5 | 0.0016 | <u>0.004</u> | 0.8 | 1.50 | 0.15 | 0.0016 | 0.0024 | 0.0015 | — | — | — | — | — | — |
| a6 | 0.0018 | <u>3.700</u> | 0.9 | 0.40 | 0.14 | 0.0017 | 0.0025 | 0.0018 | — | — | — | — | — | — |
| a7 | 0.0015 | 1.8 | <u>0.004</u> | 0.35 | 0.15 | 0.0016 | 0.0024 | 0.0017 | — | — | — | — | — | — |
| a8 | 0.0017 | 1.6 | 0.8 | <u>2.70</u> | 0.15 | 0.0018 | 0.0024 | 0.0016 | — | — | — | — | — | — |
| a9 | 0.0019 | 1.6 | 1.0 | 0.40 | <u>0.20</u> | 0.0016 | 0.0022 | 0.0017 | — | — | — | — | — | — |
| a10 | 0.0016 | 1.8 | 0.9 | 0.45 | 0.17 | <u>0.0040</u> | 0.0019 | 0.0018 | — | — | — | — | — | — |
| a11 | 0.0014 | 1.7 | 0.8 | 0.40 | 0.16 | 0.0016 | <u>0.0050</u> | 0.0019 | — | — | — | — | — | — |
| a12 | 0.0017 | 1.6 | 0.8 | 0.35 | 0.15 | 0.0017 | 0.0021 | <u>0.0030</u> | — | — | — | — | — | — |

TABLE 3

| TEST No. | STEEL No. | SLAB HEATING TEMPERATURE °C. | FINISH TEMPERATURE OF HOT ROLLING °C. | INCUBATION TREATMENT TEMPERATURE °C. | TIME MIN. | REDUCTION OF COLD ROLLING % | FINAL ANNEALING | | | NOTE |
|---|---|---|---|---|---|---|---|---|---|---|
| | | | | | | | HEATING RATE °C./SEC. | HOLDING TEMPERATURE °C. | HOLDING TIME SEC. | |
| B1 | A1 | 1100 | 1020 | 800 | 180 | 78 | 35 | 820 | 30 | INVENTIVE EXAMPLE |
| B2 | A2 | 1100 | 1020 | 950 | 120 | 85 | 32 | 820 | 30 | INVENTIVE EXAMPLE |
| B3 | A3 | 1150 | 920 | 750 | 10 | 75 | 34 | 790 | 30 | INVENTIVE EXAMPLE |
| B4 | A4 | 1100 | 1020 | 950 | 120 | 85 | 32 | 820 | 30 | INVENTIVE EXAMPLE |
| B5 | A5 | 1100 | 1020 | 800 | 180 | 78 | 35 | 820 | 30 | INVENTIVE EXAMPLE |
| B6 | A6 | 1150 | 920 | 750 | 10 | 75 | 34 | 790 | 30 | INVENTIVE EXAMPLE |
| B7 | A7 | 1100 | 1020 | 800 | 180 | 78 | 35 | 820 | 30 | INVENTIVE EXAMPLE |
| B8 | A8 | 1100 | 1020 | 950 | 120 | 85 | 32 | 820 | 30 | INVENTIVE EXAMPLE |

TABLE 3-continued

| TEST No. | STEEL No. | SLAB HEATING TEMPERATURE °C. | FINISH TEMPERATURE OF HOT ROLLING °C. | INCUBATION TREATMENT TEMPERATURE °C. | TIME MIN. | REDUCTION OF COLD ROLLING % | FINAL ANNEALING HEATING RATE °C./SEC. | HOLDING TEMPERATURE °C. | HOLDING TIME SEC. | NOTE |
|---|---|---|---|---|---|---|---|---|---|---|
| B9 | A9 | 1100 | 900 | 700 | 30 | 83 | 33 | 800 | 30 | INVENTIVE EXAMPLE |
| B10 | A10 | 1100 | 900 | 700 | 30 | 83 | 33 | 800 | 30 | INVENTIVE EXAMPLE |
| B11 | A11 | 1150 | 920 | 750 | 10 | 75 | 34 | 790 | 30 | INVENTIVE EXAMPLE |
| B12 | A12 | 1150 | 1030 | 820 | 160 | 81 | 31 | 780 | 30 | INVENTIVE EXAMPLE |
| B13 | A13 | 1100 | 1020 | 950 | 120 | 85 | 32 | 820 | 30 | INVENTIVE EXAMPLE |
| B14 | A14 | 1100 | 900 | 700 | 30 | 83 | 33 | 800 | 30 | INVENTIVE EXAMPLE |
| B15 | A15 | 1150 | 1020 | 950 | 120 | 78 | 35 | 820 | 30 | INVENTIVE EXAMPLE |
| B16 | A16 | 1100 | 900 | 700 | 30 | 83 | 33 | 800 | 30 | INVENTIVE EXAMPLE |
| B17 | A17 | 1100 | 1020 | 800 | 180 | 78 | 35 | 790 | 30 | INVENTIVE EXAMPLE |
| B18 | A18 | 1100 | 920 | 750 | 10 | 85 | 32 | 790 | 30 | INVENTIVE EXAMPLE |
| B19 | A18 | 1100 | 920 | 750 | 10 | 85 | 60 | 790 | 30 | INVENTIVE EXAMPLE |

TABLE 4

| TEST No. | STEEL No. | SLAB HEATING TEMPERATURE °C. | FINISH TEMPERATURE OF HOT ROLLING °C. | INCUBATION TREATMENT TEMPERATURE °C. | TIME MIN. | REDUCTION OF COLD ROLLING % | FINAL ANNEALING HEATING RATE °C./SEC. | HOLDING TEMPERATURE °C. | HOLDING TIME SEC. | NOTE |
|---|---|---|---|---|---|---|---|---|---|---|
| b1 | a1 | 1150 | 990 | 800 | 25 | 78 | 34 | 800 | 30 | COMPARATIVE EXAMPLE |
| b2 | a2 | 1100 | 820 | 650 | 15 | 83 | 29 | 800 | 30 | COMPARATIVE EXAMPLE |
| b3 | a3 | 1150 | 950 | 750 | 5 | 75 | 30 | 790 | 30 | COMPARATIVE EXAMPLE |
| b4 | a4 | 1100 | 820 | 650 | 15 | 83 | 29 | 800 | 30 | COMPARATIVE EXAMPLE |
| b5 | a5 | 1100 | 1020 | 950 | 120 | 85 | 32 | 820 | 30 | COMPARATIVE EXAMPLE |
| b6 | a6 | 1100 | 900 | 700 | 30 | CRACKING | — | — | — | COMPARATIVE EXAMPLE |
| b7 | a7 | 1100 | 1020 | 800 | 180 | 78 | 35 | 820 | 30 | COMPARATIVE EXAMPLE |
| b8 | a8 | 1150 | 920 | 750 | 10 | 75 | 34 | 790 | 30 | COMPARATIVE EXAMPLE |
| b9 | a9 | 1150 | 1030 | 820 | 160 | CRACKING | — | — | — | COMPARATIVE EXAMPLE |
| b10 | a10 | 1100 | 900 | 700 | 30 | 83 | 33 | 800 | 30 | COMPARATIVE EXAMPLE |
| b11 | a11 | 1150 | 1030 | 820 | 160 | 81 | 31 | 780 | 30 | COMPARATIVE EXAMPLE |
| b12 | a12 | 1100 | 1020 | 950 | 120 | 85 | 32 | 820 | 30 | COMPARATIVE EXAMPLE |
| b13 | A3 | 1150 | 900 | 680 | 30 | 78 | 35 | 820 | 30 | COMPARATIVE EXAMPLE |
| b14 | A1 | 1100 | 1100 | 970 | 30 | 83 | 38 | 800 | 30 | COMPARATIVE EXAMPLE |

TABLE 4-continued

| TEST No. | STEEL No. | SLAB HEATING TEMPERATURE °C. | FINISH TEMPERATURE OF HOT ROLLING °C. | INCUBATION TREATMENT TEMPERATURE °C. | TIME MIN. | REDUCTION OF COLD ROLLING % | FINAL ANNEALING HEATING RATE °C./SEC. | HOLDING TEMPERATURE °C. | HOLDING TIME SEC. | NOTE |
|---|---|---|---|---|---|---|---|---|---|---|
| b15 | A5 | 1100 | 950 | 750 | 8 | 81 | 37 | 780 | 30 | COMPARATIVE EXAMPLE |
| b16 | A3 | 1150 | 990 | 800 | 190 | 83 | 35 | 800 | 30 | COMPARATIVE EXAMPLE |
| b17 | A7 | 1100 | 920 | 750 | 30 | 78 | 28 | 790 | 30 | COMPARATIVE EXAMPLE |

TABLE 5

| | | DISTRIBUTION STATE OF AlN PRECIPITATES | | | | MAGNETIC CHARACTERISTICS BEFORE AND BEFORE SRA $B_{50}$ T | BEFORE AND AFTER SRA $\Delta B_{50}$ T | BEFORE AGING $W_{15/50}$ W/kg | AFTER AGING $W_{15/50}$ W/kg | BEFORE AND AFTER AGING $\Delta W_{15/50}$ W/kg | |
|---|---|---|---|---|---|---|---|---|---|---|---|
| TEST No. | STEEL No. | 1/10 t NUMBER DENSITY PIECE/μm² | 1/5 t NUMBER DENSITY PIECE/μm² | 1/2 t NUMBER DENSITY PIECE/μm² | PDR % | | | | | | NOTE |
| B1 | A1 | 0.000020 | 0.000016 | 0.000015 | 33.3 | 1.75 | 0.001 | 3.41 | 3.71 | 0.30 | INVENTIVE EXAMPLE |
| B2 | A2 | 0.000030 | 0.000025 | 0.000021 | 42.9 | 1.65 | 0.006 | 2.25 | 2.25 | 0.00 | INVENTIVE EXAMPLE |
| B3 | A3 | 0.000030 | 0.000029 | 0.000024 | 25.0 | 1.67 | 0.001 | 2.68 | 2.70 | 0.02 | INVENTIVE EXAMPLE |
| B4 | A4 | 0.000020 | 0.000018 | 0.000016 | 25.0 | 1.69 | 0.001 | 2.88 | 2.88 | 0.00 | INVENTIVE EXAMPLE |
| B5 | A5 | 0.000030 | 0.000027 | 0.000022 | 36.4 | 1.70 | 0.001 | 2.93 | 2.94 | 0.01 | INVENTIVE EXAMPLE |
| B6 | A6 | 0.000040 | 0.000030 | 0.000029 | 37.9 | 1.68 | 0.001 | 2.76 | 2.80 | 0.04 | INVENTIVE EXAMPLE |
| B7 | A7 | 0.000010 | 0.000007 | 0.000007 | 42.9 | 1.72 | 0.004 | 3.28 | 3.30 | 0.02 | INVENTIVE EXAMPLE |
| B8 | A8 | 0.000030 | 0.000028 | 0.000021 | 42.9 | 1.70 | 0.003 | 3.23 | 3.30 | 0.07 | INVENTIVE EXAMPLE |
| B9 | A9 | 0.000030 | 0.000025 | 0.000022 | 36.4 | 1.66 | 0.001 | 2.68 | 2.69 | 0.01 | INVENTIVE EXAMPLE |
| B10 | A10 | 0.000020 | 0.000018 | 0.000015 | 33.3 | 1.67 | 0.001 | 2.76 | 2.77 | 0.01 | INVENTIVE EXAMPLE |
| B11 | A11 | 0.000030 | 0.000025 | 0.000022 | 36.4 | 1.65 | 0.000 | 2.67 | 2.67 | 0.00 | INVENTIVE EXAMPLE |
| B12 | A12 | 0.000040 | 0.000033 | 0.000028 | 42.9 | 1.74 | 0.005 | 1.47 | 1.47 | 0.00 | INVENTIVE EXAMPLE |
| B13 | A13 | 0.000010 | 0.000008 | 0.000007 | 42.9 | 1.69 | 0.003 | 3.30 | 3.30 | 0.00 | INVENTIVE EXAMPLE |
| B14 | A14 | 0.000030 | 0.000022 | 0.000022 | 36.4 | 1.69 | 0.001 | 3.43 | 3.43 | 0.00 | INVENTIVE EXAMPLE |
| B15 | A15 | 0.000040 | 0.000030 | 0.000029 | 37.9 | 1.73 | 0.002 | 2.96 | 3.02 | 0.06 | INVENTIVE EXAMPLE |
| B16 | A16 | 0.000031 | 0.000025 | 0.000022 | 40.9 | 1.68 | 0.001 | 2.88 | 2.92 | 0.04 | INVENTIVE EXAMPLE |
| B17 | A17 | 0.000030 | 0.000025 | 0.000021 | 42.9 | 1.72 | 0.003 | 2.88 | 2.91 | 0.03 | INVENTIVE EXAMPLE |
| B18 | A18 | 0.000020 | 0.000018 | 0.000015 | 33.3 | 1.70 | 0.001 | 2.96 | 2.97 | 0.01 | INVENTIVE EXAMPLE |
| B19 | A18 | 0.000028 | 0.000028 | 0.000021 | 33.3 | 1.70 | 0.001 | 2.96 | 2.97 | 0.01 | INVENTIVE EXAMPLE |

TABLE 6

| TEST No. | STEEL No. | DISTRIBUTION STATE OF AlN PRECIPITATES | | | | MAGNETIC CHARACTERISTICS | | | | | NOTE |
|---|---|---|---|---|---|---|---|---|---|---|---|
| | | $1/10\,t$ NUMBER DENSITY PIECE/$\mu m^2$ | $1/5\,t$ NUMBER DENSITY PIECE/$\mu m^2$ | $1/2\,t$ NUMBER DENSITY PIECE/$\mu m^2$ | PDR % | BEFORE SRA $B_{50}$ T | BEFORE AND AFTER SRA $\Delta B_{50}$ T | BEFORE AGING $W_{15/50}$ W/kg | AFTER AGING $W_{15/50}$ W/kg | BEFORE AND AFTER AGING $\Delta W_{15/50}$ W/kg | |
| b1 | a1 | 0.000020 | 0.000016 | 0.000014 | 42.9 | 1.74 | 0.007 | 3.43 | 3.90 | 0.47 | COMPARATIVE EXAMPLE |
| b2 | a2 | 0.000020 | 0.000017 | 0.000012 | 66.7 | 1.67 | 0.015 | 2.65 | 2.67 | 0.02 | COMPARATIVE EXAMPLE |
| b3 | a3 | 0.000030 | 0.000022 | 0.000019 | 57.9 | 1.71 | 0.013 | 2.99 | 2.99 | 0.00 | COMPARATIVE EXAMPLE |
| b4 | a4 | 0.000040 | 0.000033 | 0.000022 | 81.8 | 1.55 | 0.026 | 2.57 | 2.57 | 0.00 | COMPARATIVE EXAMPLE |
| b5 | a5 | 0.000030 | 0.000025 | 0.000022 | 36.4 | 1.69 | 0.005 | 3.58 | 3.63 | 0.05 | COMPARATIVE EXAMPLE |
| b6 | a6 | — | — | — | — | — | — | — | — | — | COMPARATIVE EXAMPLE |
| b7 | a7 | 0.000040 | 0.000033 | 0.000028 | 42.9 | 1.57 | 0.005 | 3.58 | 3.61 | 0.03 | COMPARATIVE EXAMPLE |
| b8 | a8 | 0.000030 | 0.000027 | 0.000022 | 36.4 | 1.55 | 0.007 | 2.57 | 3.58 | 1.01 | COMPARATIVE EXAMPLE |
| b9 | a9 | — | — | — | — | — | — | — | — | — | COMPARATIVE EXAMPLE |
| b10 | a10 | 0.000030 | 0.000025 | 0.000021 | 42.9 | 1.72 | 0.002 | 3.58 | 3.60 | 0.02 | COMPARATIVE EXAMPLE |
| b11 | a11 | 0.000020 | 0.000018 | 0.000015 | 33.3 | 1.72 | 0.003 | 3.56 | 3.57 | 0.01 | COMPARATIVE EXAMPLE |
| b12 | a12 | 0.000030 | 0.000022 | 0.000021 | 42.9 | 1.72 | 0.005 | 3.58 | 3.59 | 0.01 | COMPARATIVE EXAMPLE |
| b13 | A3 | 0.000031 | 0.000022 | 0.000020 | 55.0 | 1.62 | 0.014 | 2.98 | 3.00 | 0.02 | COMPARATIVE EXAMPLE |
| b14 | A1 | 0.000020 | 0.000017 | 0.000013 | 53.8 | 1.64 | 0.015 | 3.41 | 3.55 | 0.14 | COMPARATIVE EXAMPLE |
| b15 | A5 | 0.000040 | 0.000033 | 0.000025 | 60.0 | 1.65 | 0.016 | 2.93 | 2.94 | 0.01 | COMPARATIVE EXAMPLE |
| b16 | A3 | 0.000022 | 0.000017 | 0.000014 | 57.1 | 1.65 | 0.017 | 3.08 | 3.12 | 0.04 | COMPARATIVE EXAMPLE |
| b17 | A7 | 0.000032 | 0.000027 | 0.000021 | 52.4 | 1.64 | 0.013 | 3.35 | 3.37 | 0.02 | COMPARATIVE EXAMPLE |

INDUSTRIAL APPLICABILITY

According to the above aspects of the present invention, it is possible to provide the non-oriented electrical steel sheet with small change in magnetic flux densities before and after the strain relief annealing (SRA). In particular, it is possible to provide the non-oriented electrical steel sheet in which the difference between the magnetic flux density $B_{50}$ before strain relief annealing and the magnetic flux density $B_{50}$ after strain relief annealing is 0.010 T or less, in regard to the average of three directions which are the rolling direction, the transverse direction, and the rolling 45° direction. Accordingly, the present invention has significant industrial applicability.

REFERENCE SIGNS LIST

1 NON-ORIENTED ELECTRICAL STEEL SHEET
3 SILICON STEEL SHEET (BASE STEEL SHEET)
5 INSULATION COATING (TENSION COATING)
11 PUNCHED PIECE
13 LAMINATION
15 TEETH
17 YOKE
100 MOTOR CORE

What is claimed is:

1. A non-oriented electrical steel sheet comprising a silicon steel sheet and an insulation coating, wherein
   the silicon steel sheet includes, as a chemical composition, by mass %,
   0.01 to 3.50% of Si,
   0.0010 to 2.500% of Al,
   0.01 to 3.00% of Mn,
   0.0030% or less of C,
   0.180% or less of P,
   0.0030% or less of S,
   0.0030% or less of N,
   0.0020% or less of B, and
   a balance consisting of Fe and impurities, and
   when t is a thickness of the silicon steel sheet and when PDR is defined as a following Expression 1 which indicates a ratio concerned with maximum and minimum of number densities of AlN precipitates in three areas which are $1/10\,t$ area, $1/5\,t$ area, and $1/2\,t$ area from a surface of the silicon steel sheet along a thickness direction,
   when the number densities of AlN are obtained by observing the three areas with a quantitative analysis of Electron Probe Micro-Analyzer (EPMA), or Transmission Electron Microscope-Energy Dispersive X-ray Spectroscopy (TED-EDS), and samples to be observed have a 30 mm×30 mm area for EPMA and a 15 mm×15 mm area for TED-EDS, wherein the samples are cut from the silicon steel sheet, at the depth of $1/10t$, $1/5t$, and $1/2t$ from the surface of the silicon steel sheet along a thickness direction, respectively, the PDR is 50% or less, wherein the PDR=(the maximum−the minimum)÷the minimum×100   Expression 1.

2. The non-oriented electrical steel sheet according to claim 1,
wherein the silicon steel sheet includes, as the chemical composition, by mass %, at least one selected from a group comprising
0.0500% or less of Sb, and
0.0100 to 0.2000% of Sn.

3. The non-oriented electrical steel sheet according to claim 1,
wherein the silicon steel sheet includes, as the chemical composition, by mass %, at least one selected from a group comprising
0 to 1.00% of Cu,
0 to 0.0400% of REM,
0 to 0.0400% of Ca, and
0 to 0.0400% of Mg.

4. The non-oriented electrical steel sheet according to claim 2,
wherein the silicon steel sheet includes, as the chemical composition, by mass %, at least one selected from a group comprising
0 to 1.00% of Cu,
0 to 0.0400% of REM,
0 to 0.0400% of Ca, and
0 to 0.0400% of Mg.

5. A non-oriented electrical steel sheet comprising a silicon steel sheet and an insulation coating, wherein the silicon steel sheet includes, as a chemical composition, by mass %,
0.01 to 3.50% of Si,
0.0010 to 2.500% of Al,
0.01 to 3.00% of Mn,
0.0030% or less of C,
0.180% or less of P,
0.0030% or less of S,
0.0030% or less of N,
0.0020% or less of B, and
a balance comprising Fe and impurities, and
when t is a thickness of the silicon steel sheet and when PDR is defined as a following Expression 1 which indicates a ratio concerned with maximum and minimum of number densities of AlN precipitates in three areas which are $1/10t$ area, $1/5t$ area, and $1/2t$ area from a surface of the silicon steel sheet along a thickness direction, when the number densities of AlN are obtained by observing the three areas with a quantitative analysis of Electron Probe Micro-Analyzer (EPMA), or Transmission Electron Microscope-Energy Dispersive X-ray Spectroscopy (TED-EDS), and samples to be observed have a 30 mm×30 mm area for EPMA and a 15 mm×15 mm area for TED-EDS, wherein the samples are cut from the silicon steel sheet, at the depth of $1/10t$, $1/5t$, and $1/2t$ from the surface of the silicon steel sheet along a thickness direction, respectively, the PDR is 50% or less, wherein the PDR=(the maximum−the minimum)÷the minimum×100   Expression 1.

\* \* \* \* \*